United States Patent
Inagawa et al.

(10) Patent No.: US 7,778,363 B2
(45) Date of Patent: Aug. 17, 2010

(54) SYNCHRONIZATION TIMING DETECTING APPARATUS, RECEIVING APPARATUS, AND SYNCHRONIZATION TIMING DETECTING METHOD

(75) Inventors: Osamu Inagawa, Kawasaki (JP); Junya Tsuchida, Kawasaki (JP)

(73) Assignee: NEC Electronics Corporation, Kanagawa (JP)

( * ) Notice: Subject to any disclaimer, the term of this patent is extended or adjusted under 35 U.S.C. 154(b) by 779 days.

(21) Appl. No.: 11/709,788

(22) Filed: Feb. 23, 2007

(65) Prior Publication Data

US 2007/0211835 A1 Sep. 13, 2007

(30) Foreign Application Priority Data

Mar. 8, 2006 (JP) .............................. 2006-063367

(51) Int. Cl.
*H03D 1/00* (2006.01)
*H01L 27/06* (2006.01)

(52) U.S. Cl. ...................... 375/343; 375/149; 375/145; 375/362; 375/367; 370/509; 370/512; 370/515

(58) Field of Classification Search ................. 375/343, 375/149, 145, 363, 364–367; 370/509–515
See application file for complete search history.

(56) References Cited

U.S. PATENT DOCUMENTS 7,609,755 B2 * 10/2009 Rasmussen .................. 375/149

FOREIGN PATENT DOCUMENTS

JP 2005-176184 6/2005

* cited by examiner

*Primary Examiner*—Phuong Phu
(74) *Attorney, Agent, or Firm*—Young & Thompson

(57) ABSTRACT

A synchronization timing detecting apparatus includes a correlation calculator configured to generate a first correlation value by calculating a cross-correlation between an input signal being sampled and a reference signal or an auto-correlation of the sampled input signal, an interpolation processor configured to generate a second correlation value interpolating a plurality of the first correlation values having a different combination of sampling points of the input signal, and a detector to detect a synchronization timing based on the first and the second correlation values.

20 Claims, 5 Drawing Sheets

RELATED ART

RELATED ART

SYNCHRONIZATION TIMING DETECTING APPARATUS, RECEIVING APPARATUS, AND SYNCHRONIZATION TIMING DETECTING METHOD

BACKGROUND OF THE INVENTION

1. Field of the Invention

The present invention relates to a receiving apparatus for controlling a phase of a reception signal using a synchronization signal included in the reception signal.

2. Description of Related Art

To send and receive framed or packetized data between a sending and a receiving apparatuses, a correlation method is used to establish a frame synchronization of a reception signal in the receiving apparatus (see Japanese Unexamined Patent Application Publication No. 2005-176184). In the correlation method, when the sending apparatus sends an information signal to the receiving apparatus, a reference signal is added to the beginning of the information signal. The reference signal is a signal sequence having a specified signal pattern repeated periodically. Such reference signal is hereinafter referred to as a preamble. The receiving apparatus calculates a cross-correlation value between a signal pattern of a known preamble and a reception signal or an auto-correlation value of the reception signal to detect a timing (hereinafter referred to as a correlation peak position), which the calculated cross-correlation value or the auto-correlation value reaches its peak. Further, the receiving apparatus identifies a start timing of an information signal by evaluating a repetition cycle of the detected correlation peak position or a change in the repetition cycle thereof. It is possible to perform receiving processes including a demodulation of an information signal by identifying the start timing of the information signal, specifically by establishing a frame synchronization.

For example in a wireless LAN that is compliant with the IEEE 802.11a standard, a preamble called a short symbol is added to the beginning of an OFDM signal being sent and received. A receiving apparatus in the wireless LAN identifies a start timing of the OFDM signal using the short symbol, then demodulates the information signal according to the identified start timing. Then the receiving apparatus demodulates the information signal by a high-speed Fourier transformation based on the identified start timing.

An establishment of a frame synchronization by the correlation method as described in the foregoing is applied to a receiving apparatus of UWB (Ultra Wide Band), which is a short distance wireless communication standard, other than a wireless LAN. One of the UWB communication systems is standardized as ECMA-368 by the ECMA (European Computer Manufacturer Association), which is a standardizing organization. In this standard, the MB-OFDM (Multi-band Orthogonal Frequency Division Multiplexing) is employed to a PHY layer.

A configuration example of a synchronization timing apparatus for detecting a correlation peak position is shown in FIG. 4. A synchronization timing apparatus 41 of FIG. 4 is used in a MB-OFDM receiving apparatus. An I component signal $I_D(t)$ and a Q component signal $Q_D(t)$, which are discrete baseband signals that are sampled and quantized by A/D converters (ADC) 40a and 40b are input to the synchronization timing detecting apparatus 41.

A correlator 411a inputs the I component signal $I_D(t)$ and a signal pattern r(i) of a preamble that is stored to a ROM (Read Only Memory) 412a so as to calculate a cross-correlation value $C_I(t)$ between $I_D(t)$ and r(i) Similarly a correlator 411b inputs the Q component signal $Q_D(t)$ and a signal pattern r(i) of a preamble stored to a ROM (Read Only Memory) 412b so as to calculate a cross-correlation value $C_Q(t)$ between $Q_D(t)$ and r(i). The cross-correlation values $Q_D(t)$ and $C_Q(t)$ can be defined respectively by the following formulas (1) and (2).

$$C_I(t) = \frac{1}{A}\sum_{i=0}^{P-1} I_D(t + i \times m) r(i) \tag{1}$$

$$C_Q(t) = \frac{1}{A}\sum_{i=0}^{P-1} Q_D(t + i \times m) r(i) \tag{2}$$

$$A = \sum_{i=0}^{P-1} |r(i)|^2 \tag{3}$$

In the formulas (1) and (2), P refers to the number of samples for one repetition pattern in a preamble. For a PLCP (Physical Layer Convergence Protocol) preamble defined by the abovementioned UWB standard, for example, P=165. In the above formulas, m refers to an integer of 1 or more that indicates an oversampling rate of the ADCs 40a and 40b. Further, A refers a normalization constant that is defined by the formula (3).

A sum of squares calculator 413 inputs cross-correlation values $C_I(t)$ and $C_Q(t)$ that are calculated by the correlators 411a and 411b, and calculates a sum of squares thereof as in $P(t)=C_I(t)^2+C_Q(t)^2$.

A threshold evaluator 414 evaluates a threshold for the sum of squares P(t) that is output from the sum of squares calculator 413 to detect a correlation peak position and outputs the detected correlation peak position as a symbol timing. A principle of the threshold evaluation by the threshold evaluator 414 is described hereinafter in detail with reference to FIG. 5. In FIG. 5, $PS_n$ (n=1, 2, ..., 21) indicates a Packet Sync Sequence that constitutes a PLCP preamble. In the PLCP preamble, the packet sync sequence is repeated for 21 symbols.

When a symbol pattern of the packet sync sequence is applied to the formulas (1) and (2) to calculate the cross-correlation values $C_I(t)$ and $C_Q(t)$, and the sum of squares P(t) thereof, the sum of squares P(t) of the cross-correlation values will reach a peak at a timing when the reception signal $I_D(t)$ and $Q_D(t)$ correspond with the symbol pattern r(i) of the packet sync sequence. The timing when the reception signals $I_D(t)$ and $Q_D(t)$ correspond with the symbol pattern r(i) of the packet sync sequence is a timing when calculating a cross-correlation for the symbol pattern r(i) of the packet sync sequence using a set of sampling points for the reception signals $I_D(t)$ and $Q_D(t)$ which have a delimiter position of the packet sync sequence at the beginning thereof. Specifically, at delimiter positions T1, T2, and T3 of the packet sync sequence shown in FIG. 5, a correlation peak is observed in P(t). A threshold of P(t) is evaluated by the threshold evaluator 414 and the correlation peak positions including T1, T2 and T3 shown in FIG. 5 are output as symbol timings. By using the symbol timings, it is possible to establish a symbol and a frame synchronization, thereby enabling to do a demodulation process etc for a subsequent OFDM signal.

As described in the foregoing, when the reception signals $I_D(t)$ and $Q_D(t)$, and the preamble r(i) that are input to the correlators 411a and 411b correspond, a correlation peak can be observed in the cross-correlation values $C_I(t)$ and $C_Q(t)$, and the sum of squares P(t) thereof. An accurate synchronization can be established by accurately capturing the correlation peak. To accurately capture the correlation peak, a sampling rate for the reception signals $I_D(t)$ and $Q_D(t)$ in the ADCs 40a and 40b needs to be higher, and intervals for the sampling points to calculate correlations by the correlators 411a and 411b needs to be narrower.

A problem generated when the sampling rate for the reception signal is low described hereinafter in detail. FIGS. 6A and 6B show the cross-correlation value $C_f(t)$ that is computed using a discrete I component signal obtained by the ADC 40a when the sampling rate of the ADC 41a is two times higher than the maximum frequency included in the baseband signal I(t). The curve R indicated by dotted lines in FIGS. 6A and 6B indicates a cross-correlation function between a continuous signal I(t) and a preamble when the ADC 40a does not perform a sampling. Further, the horizontal axis in FIGS. 6A and 6B indicates time that is standardized by a sampling time $T_s$ (an inverse of the sampling rate), where the time 0 is a correlation peak position.

If a sampling phase of the reception signal I(t) in the ADC 40a is a phase that is possible to sample a delimiter position of a packet sync sequence $PS_n$, the discrete cross-correlation value $C_f(t)$ that is output by the correlator 411a will be the one as in FIG. 6B. In FIG. 6B, with a center of a time k, four sampling points before and after the time k are indicated by cross-correlation values $C_f(k-4)$ to $C_f(k+4)$. In the sampling phase like the one shown in FIG. 6B, a correlation peak is included in the cross-correlation values output from the correlator 411a, thus an accurate establishment of a synchronization can be possible by detecting the correlation peak. In FIG. 6B, $C_f(k)$ corresponds to the correlation peak.

On the other hand in FIG. 6A, cross-correlation values $C_f(k-4)$ to $C_f(k+4)$ that are output from the correlator 411a are shown when the sampling time of the reception signal I(t) in the ADC 40a is shifted for a ½ period as compared to the case as in FIG. 6B where the sampling time of the reception signal I(t). In such sampling phase, a genuine correlation peak is not included in the cross-correlation values that are output from the correlator 411a. Accordingly in such sampling phase, a correlation peak value cannot be accurately detected and it is difficult to detect a correlation peak depending on a threshold that is specified to the threshold evaluator 414. Furthermore, if a detection threshold for a correlation peak in the threshold evaluator 414 is set smaller in order to detect a small correlation peak, it is more likely to incorrectly detect a peak in a cross-correlation value that is generated due to noise.

Therefore, to prevent a fluctuation of a synchronization accuracy that is dependent on a sampling phase of the ADC 40a, it is necessary to improve the sampling rate of the ADC 40a to conduct an oversampling.

As described in the foregoing, to accurately establish a synchronization by the correlation method in the receiving apparatus for receiving framed (packetized) data, it is necessary to conduct an oversampling when sampling and discretizing a reception signal. However it has now been discovered that an increase in a sampling rate causes an increase in a circuit size of the receiving apparatus and also an increase in power consumption. Therefore, to reduce the circuit size of the receiving apparatus and the power consumption, it is desirable to reduce the sampling rate of the reception signal while maintaining an accuracy of a synchronization establishment.

SUMMARY OF THE INVENTION

According to an aspect of the present invention, there is provided a synchronization timing detecting apparatus includes a correlation calculator configured to generate a first correlation value by calculating a cross-correlation between an input signal being sampled and a reference signal or an auto-correlation of the sampled input signal, an interpolation processor configured to generate a second correlation value interpolating a plurality of the first correlation values having a different combination of sampling points of the input signal, and a detector to detect a synchronization timing based on the first and the second correlation values.

Such configuration enables to detect synchronization timing, that is a correlation peak position, from the first correlation value calculated using the sampling points and a second correlation value (an interpolation correlation value) that interpolates between a plurality of the first correlation value. Specifically, it is possible to suppress an accuracy in synchronization establishments that is dependent on a sampling phase of an input signal from deteriorating. This accomplishes an accuracy of synchronization establishments at a lower sampling rate in the same level when using the conventional synchronization timing detecting apparatus 40. Accordingly, by using the synchronization timing detecting apparatus according to the present invention, it is possible to suppress an increase in the circuit size and the power consumption caused by oversampling an A/D converter for sampling an input signal.

According to another aspect of the present invention, there is provided a receiving apparatus that includes the abovementioned synchronization timing detecting apparatus, a sampling unit to sample the input signal to output to the synchronization timing detecting apparatus, and a demodulator to demodulate the input signal according to a synchronization timing detected by the synchronization timing detecting apparatus.

According to another aspect of the present invention, there is provided a method of detecting a synchronization timing from an input signal that includes generating a first correlation value by calculating a cross-correlation between the input signal being sampled and the reference signal or an auto-correlation of the sampled input signal, generating a second correlation value interpolating a plurality of the first correlation values having a different combination of sampling points of the input signal, and detecting a synchronization timing by use of the first and the second correlation values.

By such method, it is possible to detect a synchronization timing, which is a correlation peak position, from the first correlation value calculated using the sampling point and the second correlation value (interpolation correlation value) that interpolates a plurality of the first correlation values even if a sampling rate of the input signal is low. This enables to reduce a sampling rate of a reception signal while maintaining an accuracy in establishing a synchronization. Accordingly it is possible to suppress an increase in the circuit size and power consumption caused by an oversampling of an A/D converter to sample an input signal.

The present invention provides a synchronization timing detecting apparatus, a receiving apparatus, and a synchronization timing detecting method for enabling to reduce a sampling rate of a reception signal while maintaining an accuracy of a synchronization establishment.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
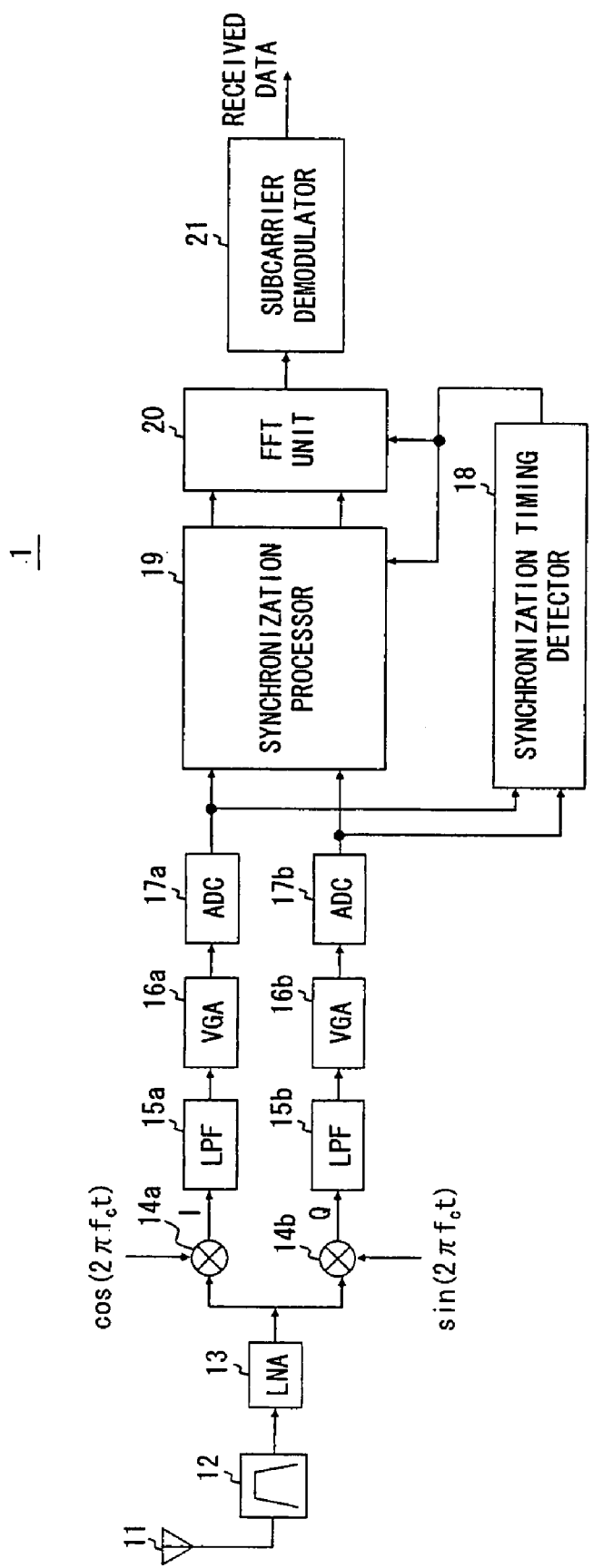
FIG. 1 is a configuration diagram showing a MB-OFDM receiving apparatus according to an embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In the drawings, components identical are denoted by reference numerals identical to those therein with repeating descriptions omitted. The embodiments described hereinbelow are incorporated to a MB-OFDM receiving apparatus.

First Embodiment

A configuration of a MB-OFDM receiving apparatus 1 according to this embodiment is shown in FIG. 1. Firstly an outline of receiving operations by the MB-OFDM receiving apparatus 1 is described hereinafter in detail. A signal received by an antenna 11 is selected of a frequency band by a band pass filter (BPF) 12. After that the signal is amplified by a low noise amplifier (LNA) 13. The BPF 12 is a filter for selecting a band group to receive from a plurality of band groups of the MB-OFDM. The signal amplified by the LNA 13 is input to mixers 14a and 14b and quadrature demodulated. Note that a frequency hopping is performed in the MB-OFDM. Accordingly a local frequency fc generated by an oscillator not shown and input to the mixers 14a and 14b are periodically switched according to a frequency hopping pattern.

An In-phase component (I component) signal I(t) and a Quadrature component (Q component) signal Q(t) of a complex baseband signal that are demodulated by the mixers 14a and 14b are removed of a high frequency component by low-pass filters (LPF) 15a and 15b. After that, the signals are amplified to a predetermined signal level by variable gain amplifiers (VGA) 16a and 16b.

An A/D converter (ADC) 17a inputs the I component signal I(t) that is amplified by the VGA 16a to sample and quantize, and outputs a digitalized and discrete I component signal $I_D(t)$. Similarly an A/D converter (ADC) 17b inputs the Q component signal Q(t) that is amplified by the VGA 16b to sample and quantize, and outputs a digitalized and discrete Q component signal $Q_D(t)$. The signals output by the ADCs 17a and 17b are input to a synchronization timing detector 18 and a synchronization processor 19.

The synchronization timing detector 18 calculates a cross-correlation value between an input signal and a known preamble signal, detects a timing at when the calculated cross-correlation value reaches its peak, and outputs the timing. The timing output from the synchronization timing detector 18 indicates a symbol timing of an OFDM signal. A configuration and an operation of the synchronization timing detector 18 are described later in detail.

The synchronization processor 19 rotates phases for the I component signal $I_D(t)$ and the Q component signal $Q_D(t)$ using the symbol timing output by the synchronization timing detector 18 so as to correct a frequency discrepancy between a carrier frequency and the local frequency fc of the reception signal. Also the synchronization processor 19 removes a preamble, a cyclic prefix (CP), and a guard interval (GI) from the $I_D(t)$ and $Q_D(t)$.

A FFT unit 20 performs a fast Fourier transform to the I component signal $I_D(t)$ and the Q component signal $Q_D(t)$ that are removed of the preamble, cyclic prefix (CP), and guard interval (GI) so as to output a subcarrier signal.

A subcarrier demodulator 21 demodulates received data by a frequency domain equalization, a deinterleave, a Viterbi decoding, and a descramble etc for each subcarrier using the pilot tone.

Figure 4:
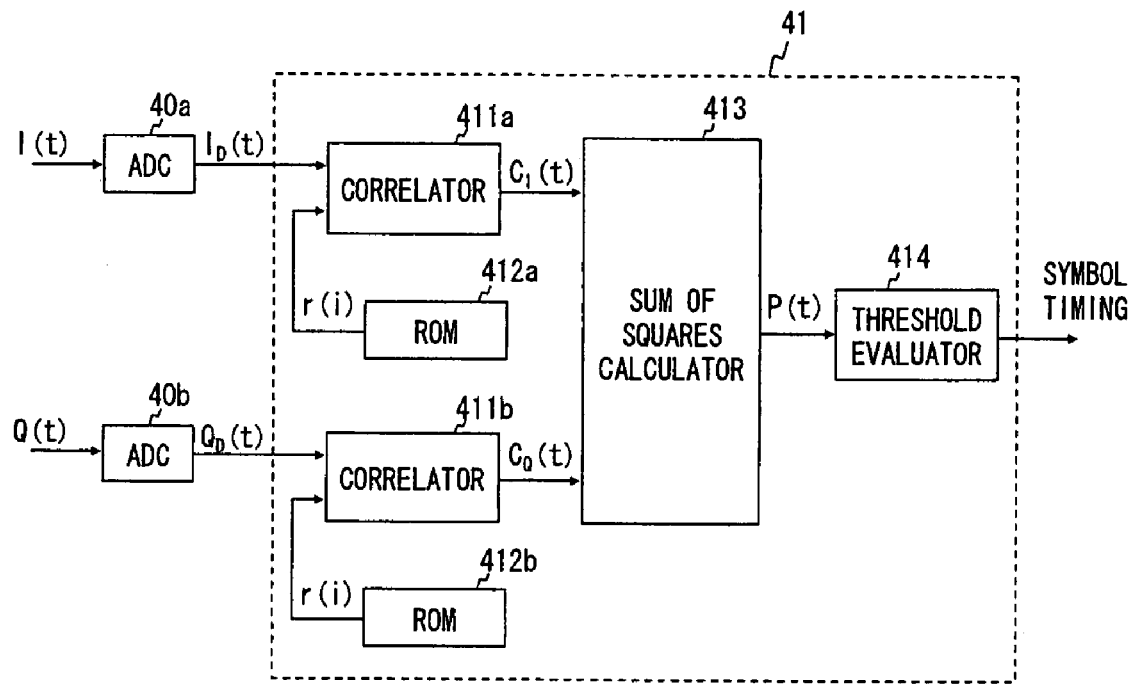
FIG. 4 is a configuration diagram showing a conventional synchronization timing detector.
Figure 5:
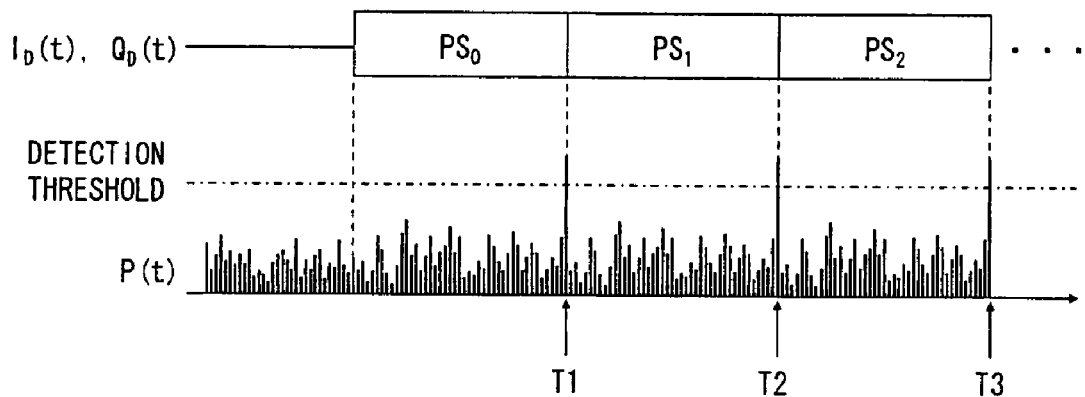
FIG. 5 is a view explaining a synchronization establishment by a correlation method.
Figure 6A:
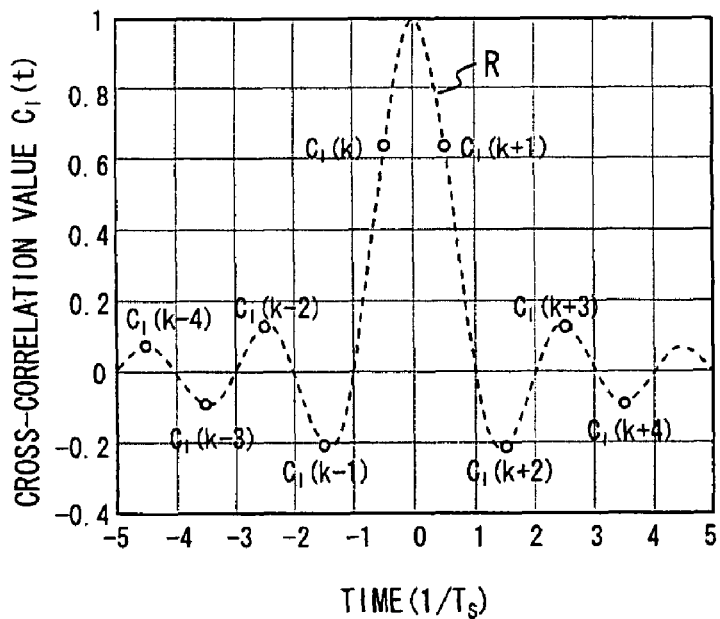
FIGS. 6A and 6B are views explaining a relationship between a sampling phase and a correlation peak detection accuracy.
Figure 6B:
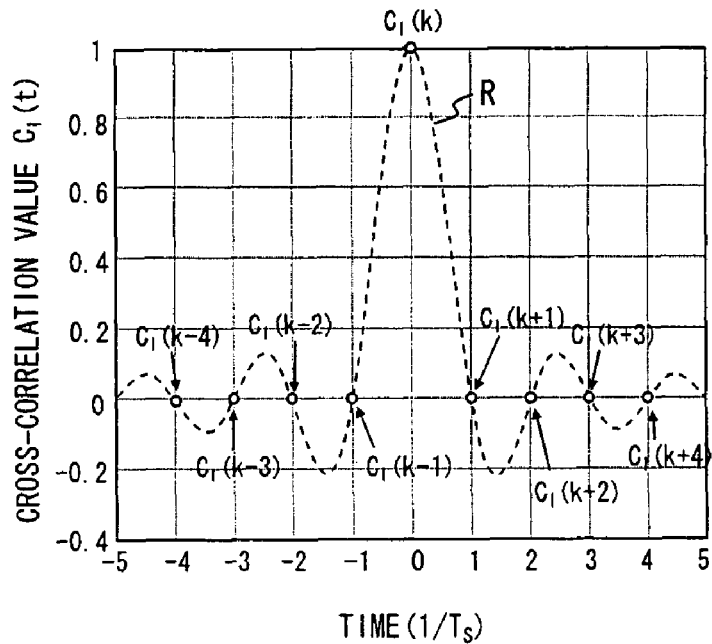

A configuration and an operation of the synchronization timing detector 18 included in the MB-OFDM receiving apparatus 1 according to this embodiment are described hereinafter in comparison with the conventional synchronization timing detecting apparatus 41 shown in FIG. 4.

Figure 2:
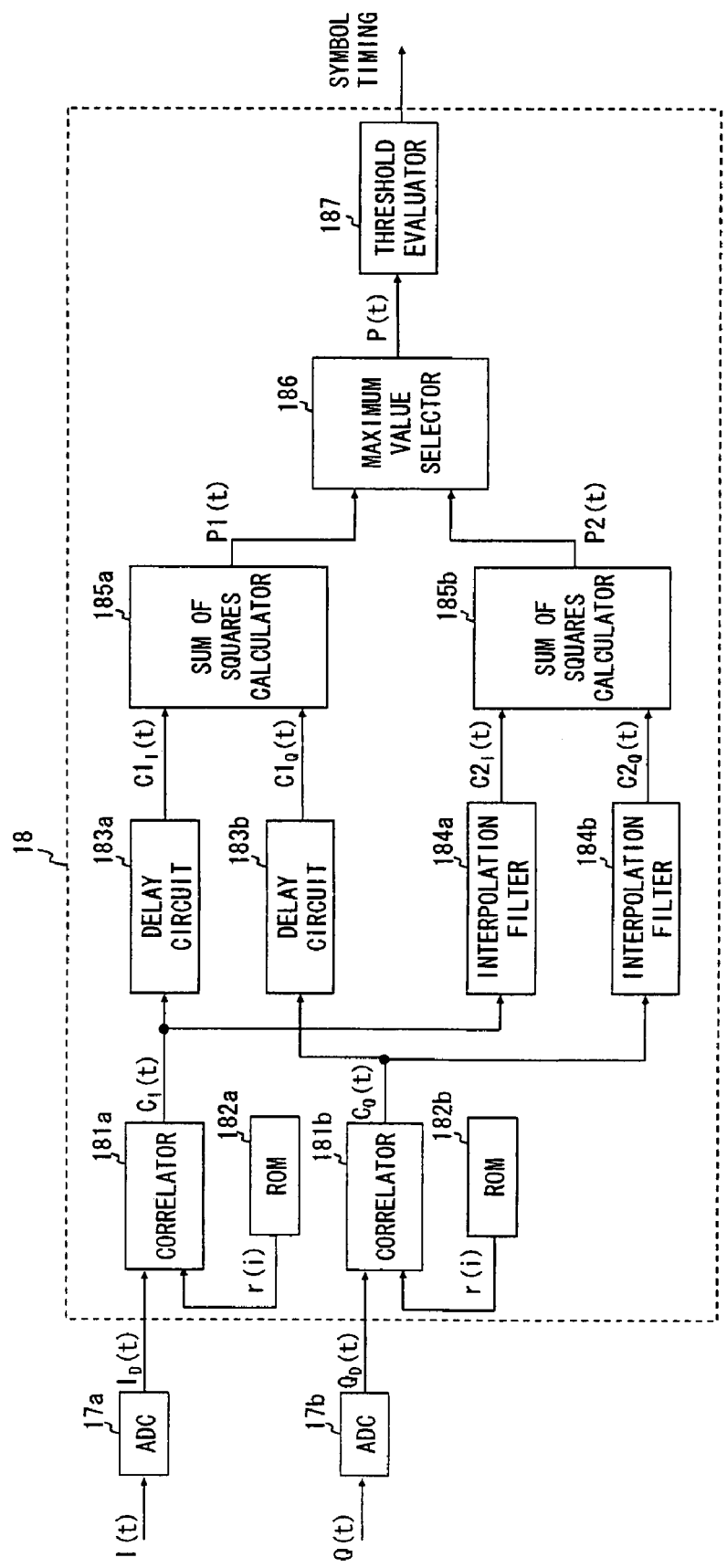
FIG. 2 is a configuration diagram showing a synchronization timing detector according to an embodiment of the present invention.

A configuration of the synchronization timing detector 18 according to this embodiment is shown in FIG. 2. Here, correlators 181a and 181b operate in the same way as the correlators 411a and 411b included in the synchronization timing detecting apparatus 41. Specifically, the correlators 181a inputs an I component signal $I_D(t)$ and a signal pattern r(i) of a preamble that is stored to a ROM (Read Only Memory) 182a to calculate a cross-correlation value $C_I(t)$ between $I_D(t)$ and r(i). The correlator 181b inputs a Q component signal $Q_D(t)$ and a signal pattern r(i) of a preamble to calculate a cross-correlation value $C_Q(t)$.

Delay circuits 183a and 183b give delays of the equivalent delay amount to interpolation filters 183a and 183b, described later in detail, to the cross-correlation values $C_I(t)$ and $C_Q(t)$ to output the values that are output from the correlators 181a and 181b, so as to align the phases of the signals that are input to sum of squares calculators 185a and 185b, described later in detail. To distinguish the output from the delay circuits 183a and 183b from the output from the interpolation filters 184a and 184b, the cross-correlation value $C_I(t)$ that is delayed by the delay circuit 183a is referred to as a cross-correlation value $C1_I(t)$, while the cross correlation value $C_Q(t)$ delayed by the delay circuit 183b is referred to as a cross-correlation value $C1_Q(t)$. Specifically, the cross-correlation values $C1_I(t)$ and $C1_Q(t)$ are calculated using the sampling points sampled by the ADCs 17a and 17b.

The interpolation filter 184a is a digital filter for inputting the cross-correlation value $C_I(t)$ that is output from the correlator 181a and generating a cross-correlation value $C2_I(t)$ in interpolation points that interpolates between a plurality of sampling points for the correlator 181a by an interpolation method which is described later in detail. The cross-correlation value $C2_I(t)$ in the interpolation points is output as interpolation data. An example where the interpolation filter 184a generates the cross-correlation value $C2_I(t)$ in the interpolation point described hereinafter.

In the interpolation filter 184a, a computation shown in a formula (4) is conducted to calculate a cross-correlation value $C2_I(k)$ in an interpolation point that is positioned between a sampling point of a time k (cross-correlation value $C_I(k)$) and that of a time k+1 (cross-correlation value $C_I(k+1)$).

$$C2_I(k) = \sum_{i=-q}^{q+1} C_I(k+i)\text{sinc}\left(\frac{1}{2}-i\right) \quad (4)$$

$$\text{sinc}(x) = \frac{\sin(\pi x)}{\pi x} \quad (5)$$

Figure 3:
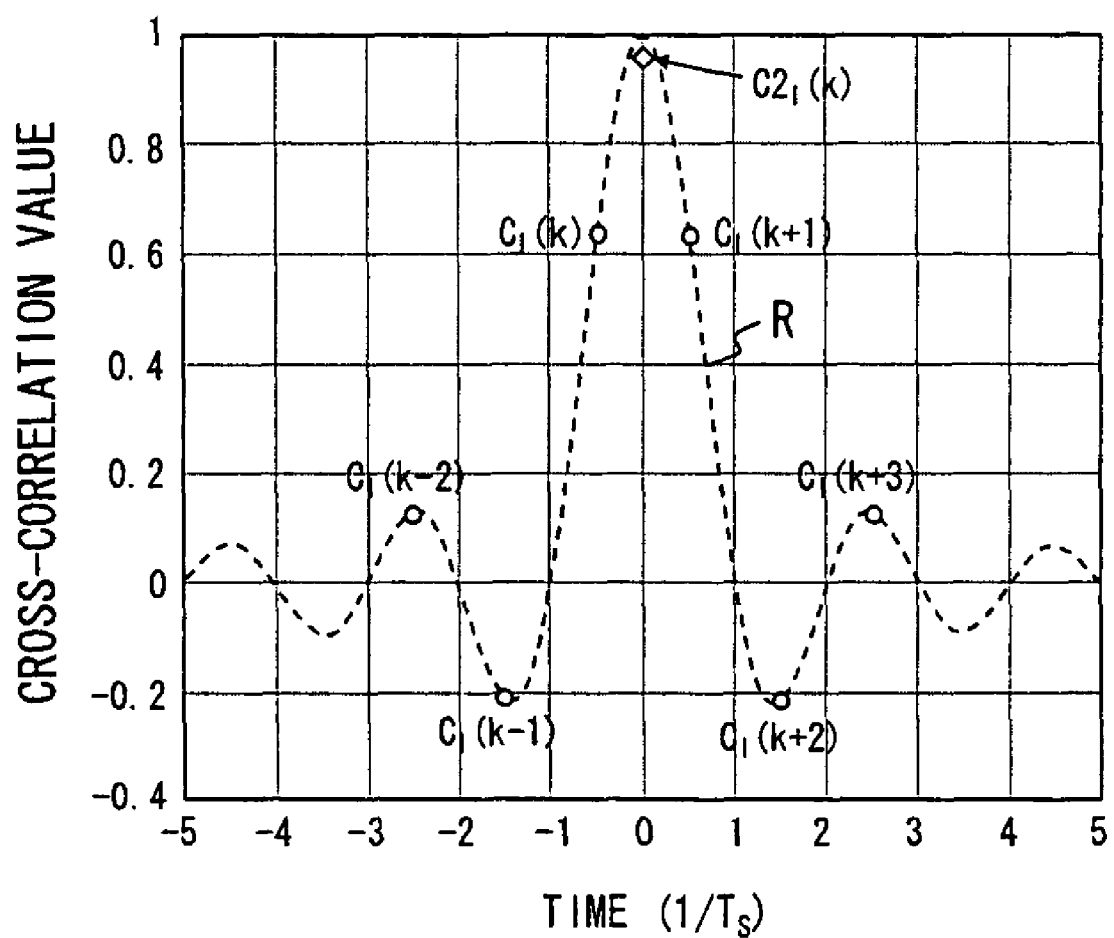
FIG. 3 is a view explaining an interpolation process by the synchronization timing detector according to an embodiment of the present invention.

In the formula (4), q refers to a parameter for defining the number of taps for the interpolation filter 184a. For example when q=2, the number of taps is 6 and an interpolation process is performed using cross-correlation values $C_I(k-2)$ to $C_I(k+3)$. FIG. 3 is a view showing the cross-correlation value $C2_I(k)$ in the interpolation points from the time k to k+1 that are calculated using 6 points of cross-correlation values $C_I(k-2)$ to $C_I(k+3)$. As shown in FIG. 3, even though the number of taps is only 6, a cross-correlation value close to when being oversampled can be interpolated.

Further, the interpolation filter 184b a digital filter for inputting the cross-correlation value $C_q(t)$ that is output from the correlator 181b and generating a cross-correlation value $C2_q(t)$ in interpolation points that interpolates between a plurality of sampling points for the correlator 181b by an interpolation method which is described later in detail.

The sum of squares calculator 185a inputs the cross-correlation values $C1_I(t)$ and $C1_q(t)$ to calculate the sum of squares thereof as in $P1(t)=C1_I(t)^2+C1_q(t)^2$. Similarly the sum of squares calculator 185b inputs the cross-correlation values $C2_I(t)$ and $C2_q(t)$ that are generated by the interpolation filters 184a and 184b performing an interpolation process so as to calculate the sum of squares thereof as in $P2(t)=C2_I(t)^2+C2_q(t)^2$.

A maximum value selector 186 inputs a sum of squares $P1(t)$ of the cross-correlation values that are calculated for the sampling points by the ADCs 17a and 17b and a sum of squares $P2(t)$ of the interpolation points that are obtained by interpolating the cross-correlation values between the sampling points. Further, the maximum value selector 186 selects a maximum value among the $P1(t)$ and $P2(t)$ to output the selected value of the sum of squares to the threshold evaluator 187. The larger the sum of squares of the cross-correlation values, the stronger the correlation between a preamble. Specifically the maximum value selector 186 selects the one that is more strongly correlated with a preamble from $P1(t)$ or $P2(t)$ to output the selected one. The value of the sum of squares selected by the maximum value selector 186 is hereinafter referred to as P(t).

An operation of the threshold evaluator 187 is same as that of the threshold evaluator 414 included in the abovementioned synchronization timing detecting apparatus 41. Specifically, the threshold evaluator 187 evaluates a threshold of the sum of squares P(t) being input, detects a correlation peak position, and outputs the detected correlation peak point as a symbol timing.

As described in the foregoing, the synchronization timing detector 18 does not simply calculate the cross-correlation values $C_I(t)$ and $C_Q(t)$ from the I component signal $I_D(t)$ and Q component signal $Q_D(t)$ that are sampled by the ADCs 17a and 17b. Specifically, the synchronization timing detector 18 estimates the cross-correlation values $C2_I(t)$ and $C2_Q(t)$ in the points interpolating the cross-correlation values $C_I(t)$ and $C_Q(t)$ and use it to detect a correlation peak position.

Accordingly the MB-OFDM receiving apparatus 1 of this embodiment is able to detect a correlation peak position by the cross-correlation values $C_I(t)$ and $C_Q(t)$ that are calculated by the sampling points and the cross-correlation values $C2_I(t)$ and $C2_Q(t)$ for the interpolation points. Therefore, it is possible to suppress an accuracy in establishing a synchronization that is dependent on a sampling phase by the ADCs 17a and 17b from deteriorating.

In other words, by using the synchronization timing detector 18, the MB-OFDM receiving apparatus 1 according to this embodiment is able to accomplish an accuracy in establishing a synchronization at the same level as when using the conventional synchronization timing detecting apparatus 40 with a lower sampling rate. For example as described in the foregoing, to calculate one interpolation point in sampling points, an accuracy in establishing a synchronization at the same level when performing an quadruple oversampling in the conventional receiving apparatus 40 can be accomplished by a double oversampling in the MB-OFDM receiving apparatus 1. This enables to reduce the sampling rates of the ADCs 17a and 17b and also reduce the power consumption.

Furthermore, the synchronization timing detector 18 of this embodiment is to select one point suitable for detecting a correlation peak from sampling points and one or a plurality of interpolation points by the maximum value selector 186. By downsampling by the maximum value selector 186, the processes after the threshold evaluator 186 may be performed at a processing rate same as a reduced sampling rate of the ADCs 17a and 17b. Such configuration enables to reduce the circuit size of the MB-OFDM receiving apparatus 1 and the power consumption in compared to when operating processors subsequent to the ADCs 17a and 17b at an oversampled processing rate.

Second Embodiment

The synchronization timing detector 18 according to a first embodiment of the present invention is described with a case when interpolating a middle point between two consecutive sampling points. However the number of interpolation points between the two consecutive sampling points may be two or more. At this time, the interpolation filters 184a and 184b may calculate cross-correlation values $C2_I(k,t)$ and $C2_Q(k,t)$ for a given point $t(k<t<k+1)$ between a sampling point at the time k and a sampling point at the time k+1 using following formulas (6) and (7).

$$C2_I(k,t) = \sum_{i=-q}^{q+1} C_I(k+i)\text{sinc}(t-i) \quad (6)$$

$$C2_Q(k,t) = \sum_{i=-q}^{q+1} C_Q(k+i)\text{sinc}(t-i) \quad (7)$$

Further, the maximum value selector 186 may be configured in a way that it selects the maximum value from a sum of squares of a cross-correlation value in the number of N interpolation points and a sum of squares of a cross-correlation value in the sampling points, where the number of the interpolation points between the sampling points is N.

By increasing the number of interpolation points, a throughput and the circuit size of the synchronization timing detector 18 increases but it becomes possible to detect a correlation peak position more accurately.

Other Embodiment

In the embodiments described above, the synchronization timing detector 18 is provided with the maximum, value selector 186, and selects a point suitable for detecting a correlation peak from the sampling points and one or a plurality of interpolation points. However the maximum value selector 186 is not necessarily needed to be provided. With such configuration, it is possible to reduce the sampling rate of at least the ADCs 17a and 17b, thereby reducing the power consumption of the ADCs 17a and 17b.

In the abovementioned embodiments, the interpolation process where a sampling function is a sinc function is described as a specific example of interpolation processes. However the sampling function is not limited to the sinc function but may be various other functions used conventionally. For example a piecewise polynomials that provides a continuous function similar to the sinc function may be used as a sampling function. Alternatively, a spline interpolation by a cubic polynomial may be performed. According to these, it is suitable for a high-speed computation because a trigonometric function and division operations are not necessary.

In the abovementioned embodiments, a correlation peak is detected by the threshold evaluator 186 evaluating a threshold for the sum of squares of the cross-correlation value. However the threshold evaluation may be performed to other measured value that is possible to detect a correlation peak, for example a cross-correlation value or an absolute value of a cross-correlation value.

In the abovementioned embodiments, a case is described in which a signal pattern of a known preamble is stored in advance to the ROMs 182a and 182b to calculate a cross-correlation between a reception signal and the known preamble. However the present invention may be applied to a case when detecting a synchronization timing by an auto-correlation of the reception signal.

Further, in a method interpolating the sampling points that are obtained by the ADCs 17a and 17b is not limited to the abovementioned interpolation process. For example not only a narrow defined interpolation method that derives an approximate function passing all the tapped sampling points, but a broadly defined interpolation method may be used, such as by a least squares approximation by a high-degree polynomial that does not require to pass all the sampling points.

In the embodiments described above, the present invention is applied to a MB-OFDM receiving apparatus, however the present invention may be applied to a receiving apparatus other than MB-OFDM.

It is apparent that the present invention is not limited to the above embodiment and it may be modified and changed without departing from the scope and spirit of the invention.

What is claimed is:

1. A synchronization timing detecting apparatus comprising:
   a correlation calculator configured to generate first correlation values by calculating a cross-correlation between an input signal being sampled and a reference signal or an auto-correlation of the sampled input signal, the first correlation values being generated from a different combination of sampling points of the input signal each other;
   an interpolation processor configured to generate a second correlation value of an interpolation point between the first correlations values by interpolating between the first correlation values; and
   a detector to detect a synchronization timing based on the first and the second correlation values.

2. The synchronization timing detecting apparatus according to claim 1, further comprising a selector to select a candidate value having the strongest correlation with the reference signal from the first and the second correlation values, wherein the detector detects a synchronization timing by use of the candidate value.

3. The synchronization timing detecting apparatus according to claim 1, further comprising a selector to select a maximum value from the first and the second correlation values,
   wherein the detector detects a synchronizing timing according to whether the maximum value exceeds a predetermined threshold.

4. The synchronization timing detecting apparatus according to claim 2, wherein the number of sampling points of the input signal for a unit of time is same as the number of inputs of the candidate value to the detector for the unit of time.

5. The synchronization timing detecting apparatus according to claim 3, wherein the number of sampling points of the input signal for a unit of time is same as the number of inputs of the maximum value to the detector for the unit of time.

6. The synchronization timing detecting apparatus according to claim 1, wherein
   (a) the input signal is a complex baseband signal,
   (b) the correlation calculator comprises:
   (i) a first correlator configured to calculate the first correlation value for an In-phase component of the complex baseband signal; and
   (ii) a second correlator configured to calculate the first correlation value for an Quadrature component of the complex baseband signal,
   (c) the interpolation processor comprises:
   (i) a first processor to generate the second correlation value for the In-phase component using the first correlation value of the In-phase component; and
   (ii) a second processor to generate the second correlation value for the Quadrature component using the first correlation value of the Quadrature component, and
   (d) the detector detects a synchronization timing based on a sum of squares of the first correlation value of the In-phase component and the first correlation value of the Quadrature component and a sum of squares of the second correlation value of the In-phase component and the second correlation value of the Quadrature component.

7. The synchronization timing detecting apparatus according to claim 3, wherein
   (a) the input signal is a complex baseband signal,
   (b) the correlation calculator comprises:
   (i) a first correlator to calculate the first correlation value for an In-phase component of the complex baseband signal; and
   (ii) a second correlator to calculate the first correlation value for a Quadrature component of the complex baseband signal,
   (c) the interpolation processor comprises:
   (i) a first processor to generate the second correlation value for the In-phase component using the first correlation value of the In-phase component; and
   (ii) a second processor to generate the second correlation value for the Quadrature component using the first correlation value of the Quadrature component, and
   (d) the selector comprises:
   (i) a first sum of squares calculator to calculate a sum of squares of the first correlation value of the In-phase component and the first correlation value of the Quadrature component;
   (ii) a second sum of squares calculator to calculate a sum of squares of the second correlation value of the In-phase component and the second correlation value of the Quadrature component; and
   (iii) a maximum value selector to select a maximum value from the sum of squares calculated by the first sum of squares calculate and the sum of squares calculated by the second sum of squares calculate to output to the detector.

8. The synchronization timing detecting apparatus according to claim 1, wherein the interpolation processor generates the second correlation value by performing an interpolation process by a sampling function.

9. A receiving apparatus comprising:
the synchronization timing detecting apparatus of claim 1;
a sampling unit to sample the input signal to output to the synchronization timing detecting apparatus; and
a demodulator to demodulate the input signal according to a synchronization timing detected by the synchronization timing detecting apparatus.

10. A receiving apparatus comprising:
the synchronization timing detecting apparatus of claim 2;
a sampling unit to sample the input signal to output to the synchronization timing detecting apparatus; and
a demodulator to demodulate the input signal according to a synchronization timing detected by the synchronization timing detecting apparatus.

11. A receiving apparatus comprising:
the synchronization timing detecting apparatus of claim 3;
a sampling unit to sample the input signal to output to the synchronization timing detecting apparatus; and
a demodulator to demodulate the input signal according to a synchronization timing detected by the synchronization timing detecting apparatus.

12. A receiving apparatus comprising:
the synchronization timing detecting apparatus of claim 6;
a sampling unit to sample the input signal to output to the synchronization timing detecting apparatus; and
a demodulator to demodulate the input signal according to a synchronization timing detected by the synchronization timing detecting apparatus.

13. A receiving apparatus comprising:
the synchronization timing detecting apparatus of claim 7;
a sampling unit to sample the input signal to output to the synchronization timing detecting apparatus; and
a demodulator to demodulate the input signal according to a synchronization timing detected by the synchronization timing detecting apparatus.

14. A receiving apparatus comprising:
the synchronization timing detecting apparatus of claim 8;
a sampling unit to sample the input signal to output to the synchronization timing detecting apparatus; and
a demodulator to demodulate the input signal according to a synchronization timing detected by the synchronization timing detecting apparatus.

15. A method of detecting a synchronization timing from an input signal comprising:
with an electronic device, generating first correlation values value by calculating a cross-correlation between the input signal being sampled and the reference signal or an auto-correlation of the sampled input signal, the first correlation values being generated from a different combination of sampling points of the input signal each other;
with the electronic device, generating a second correlation value of an interpolation point between the first correlations values by interpolating between the first correlation values; and
with the electronic device, detecting a synchronization timing by use of the first and the second correlation values.

16. The method according to claim 15, wherein the detection of the synchronization timing is performed by selecting a candidate value having the strongest correlation with the reference signal from the first and the second correlation values and determining whether the candidate value exceeds a predetermined threshold.

17. The method according to claim 15, wherein the detection of the synchronization timing is performed by selecting a maximum value from the first and the second correlation values and determining whether the maximum value exceeds a predetermined threshold.

18. A synchronization timing detecting apparatus comprising:
a correlation calculator with an input for a complex baseband input signal, the correlation calculator configured to generate first correlation values by calculating a cross-correlation between the input signal being sampled and a reference signal or an auto-correlation of the sampled input signal,
the correlation calculator configured to
(i) calculate and output a first correlation value for an In-phase component of the complex baseband signal, and
(ii) calculate and output the first correlation value for an Quadrature component of the complex baseband signal,
the first correlation values being generated from a different combination of sampling points of the input signal;
an interpolation processor configured to generate second correlation values of an interpolation point between the first correlations values by interpolating between the first correlation values, the interpolation processor configured to
(i) receive the first correlation value for an In-phase component of the complex baseband signal output from the correlation calculator, and generate a second correlation value for the In-phase component based on the input first correlation value of the In-phase component, and
(ii) receive the first correlation value for an Quadrature component of the complex baseband signal output from the correlation calculator, and generate to generate a second correlation value for the Quadrature component using the input first correlation value of the Quadrature component; and
a detector receiving outputs of the correlation calculator and the interpolation processor to detect a synchronization timing based on the first and the second correlation values, the detector detecting a synchronization timing based on a sum of squares of the first correlation value of the In-phase component and the first correlation value of the Quadrature component and a sum of squares of the second correlation value of the In-phase component and the second correlation value of the Quadrature component.

19. The synchronization timing detecting apparatus according to claim 18, further comprising a selector to select a candidate value having the strongest correlation with the reference signal from the first and the second correlation values,
wherein the detector detects a synchronization timing by use of the candidate value.

20. The synchronization timing detecting apparatus according to claim 18, further comprising a selector to select a maximum value from the first and the second correlation values,
wherein the detector detects a synchronizing timing according to whether the maximum value exceeds a predetermined threshold.

* * * * *